United States Patent
Lin

(10) Patent No.: US 12,489,652 B2
(45) Date of Patent: Dec. 2, 2025

(54) PRESENTING CAPTURED SCREEN CONTENT WITHIN A VIRTUAL CONFERENCING SYSTEM

(71) Applicant: Snap Inc., Santa Monica, CA (US)

(72) Inventor: Andrew Cheng-Min Lin, Long Island City, NY (US)

(73) Assignee: Snap Inc, Santa Monica, CA (US)

( * ) Notice: Subject to any disclaimer, the term of this patent is extended or adjusted under 35 U.S.C. 154(b) by 328 days.

(21) Appl. No.: 17/823,688

(22) Filed: Aug. 31, 2022

(65) Prior Publication Data

US 2024/0073050 A1     Feb. 29, 2024

(51) Int. Cl.
*H04L 12/18*     (2006.01)
*G06F 3/0484*     (2022.01)

(52) U.S. Cl.
CPC ........ *H04L 12/1822* (2013.01); *G06F 3/0484* (2013.01)

(58) Field of Classification Search
CPC ....... H04L 12/1822; H04L 12/18–1895; G06F 3/048; G06F 3/0484; G06Q 10/101
See application file for complete search history.

(56) References Cited

U.S. PATENT DOCUMENTS

| | | | |
|---|---|---|---|
| 5,949,414 A | 9/1999 | Namikata et al. | |
| 10,360,894 B1 | 7/2019 | Rakshit et al. | |
| 11,070,768 B1 | 7/2021 | Krol et al. | |
| 11,128,483 B1 * | 9/2021 | Surazski | G06V 20/30 |
| 11,153,442 B1 | 10/2021 | Balyasny et al. | |

(Continued)

FOREIGN PATENT DOCUMENTS

| | | |
|---|---|---|
| WO | WO-2022212386 A1 | 10/2022 |
| WO | WO-2022212391 A1 | 10/2022 |

OTHER PUBLICATIONS

Zoom. Teachers: Top Features for Securing Your Virtual Classrooms & Enhancing Students' Learning Experiences. Aug. 20, 2020. Zoom. <https://blog.zoom.us/teachers-top-features-for-securing-virtual-classrooms-enhancing-student-learning-experiences/> (Year : 2020).*

(Continued)

*Primary Examiner* — Liang Y Li
(74) *Attorney, Agent, or Firm* — Schwegman Lundberg & Woessner, P.A.

(57) ABSTRACT

Aspects of the present disclosure involve a system comprising a computer-readable storage medium storing a program and method for presenting captured screen content within a virtual conferencing system. The program and method provide, in association with designing a room for virtual conferencing, a first interface for configuring at least one participant video element which is assignable to a respective participant video feed; receive, via the first interface, an indication of user input for setting first properties for the at least one participant video element; provide, in association with designing the room, a second interface for configuring presentation of screen content captured during virtual conferencing; receive, via the second interface, an indication of user input for setting second properties for the presentation of the screen content captured during virtual conferencing; and provide, in association with virtual conferencing, display of the room based on the first properties and the second properties.

20 Claims, 10 Drawing Sheets

(56) References Cited

U.S. PATENT DOCUMENTS

| | | |
|---|---|---|
| 11,196,963 B1 * | 12/2021 | DiPasquale .......... H04L 65/403 |
| 11,362,848 B1 | 6/2022 | Lin et al. |
| 11,381,411 B1 | 7/2022 | Gale et al. |
| 2005/0078613 A1 | 4/2005 | Covell et al. |
| 2005/0276405 A1 | 12/2005 | Fernandes et al. |
| 2006/0002315 A1 * | 1/2006 | Theurer .............. H04L 67/1095 |
| | | 370/261 |
| 2009/0303984 A1 | 12/2009 | Clark et al. |
| 2010/0306647 A1 | 12/2010 | Zhang et al. |
| 2012/0017149 A1 | 1/2012 | Lai et al. |
| 2012/0166952 A1 * | 6/2012 | Alexandrov ......... G06Q 10/101 |
| | | 715/730 |
| 2014/0267550 A1 * | 9/2014 | Nimri ................... H04N 7/152 |
| | | 348/14.09 |
| 2018/0048683 A1 | 2/2018 | Katekar et al. |
| 2018/0359293 A1 | 12/2018 | Faulkner et al. |
| 2020/0366630 A1 * | 11/2020 | Gorny .................... H04L 51/10 |
| 2021/0399911 A1 | 12/2021 | Jorasch et al. |
| 2022/0052863 A1 | 2/2022 | Harrington |
| 2022/0115020 A1 * | 4/2022 | Bradley ................ G06F 3/0334 |
| 2022/0116434 A1 * | 4/2022 | Mayfield ............. H04L 12/1822 |
| 2022/0124283 A1 | 4/2022 | Krol et al. |
| 2022/0124286 A1 | 4/2022 | Punwani et al. |
| 2022/0321369 A1 | 10/2022 | Lin et al. |
| 2022/0321371 A1 | 10/2022 | Lin et al. |
| 2022/0321372 A1 | 10/2022 | Cho et al. |
| 2022/0321373 A1 | 10/2022 | Lin et al. |
| 2022/0321374 A1 | 10/2022 | Lin et al. |
| 2022/0321375 A1 | 10/2022 | Lin et al. |
| 2022/0321376 A1 | 10/2022 | Lin et al. |
| 2022/0321613 A1 | 10/2022 | Lin et al. |
| 2022/0321617 A1 | 10/2022 | Gale et al. |
| 2022/0321832 A1 | 10/2022 | Lin et al. |
| 2022/0321833 A1 | 10/2022 | Lin et al. |
| 2022/0385490 A1 | 12/2022 | Lin et al. |
| 2022/0407735 A1 | 12/2022 | Gale et al. |
| 2023/0032922 A1 | 2/2023 | Lin et al. |
| 2023/0094963 A1 | 3/2023 | Lin et al. |
| 2023/0095314 A1 | 3/2023 | Lin et al. |
| 2023/0096597 A1 | 3/2023 | Lin et al. |
| 2023/0101377 A1 | 3/2023 | Lin et al. |
| 2023/0101879 A1 | 3/2023 | Lin et al. |
| 2023/0367459 A1 * | 11/2023 | Huh ..................... H04N 21/478 |

OTHER PUBLICATIONS

"U.S. Appl. No. 17/390,510, Non Final Office Action mailed Aug. 18, 2022", 14 pgs.

"U.S. Appl. No. 17/390,510, Notice of Allowance mailed Dec. 27, 2022", 8 pgs.

"U.S. Appl. No. 17/390,510, Response filed Nov. 18, 2022 to Non Final Office Action mailed Aug. 18, 2022", 8 pgs.

* cited by examiner

PRESENTING CAPTURED SCREEN CONTENT WITHIN A VIRTUAL CONFERENCING SYSTEM

TECHNICAL FIELD

The present disclosure relates generally to virtual conferencing systems, including presenting captured screen content within a virtual conferencing system.

BACKGROUND

A virtual conferencing system provides for the reception and transmission of audio and video data between devices, for communication between device users in real-time.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

A virtual conferencing system provides for the reception and transmission of audio and video data between devices, for communication between device users in real-time. The virtual conferencing system as described herein allows a user to design or select a virtual space with one or more rooms for real-time communication. A given room may include different elements, such as participant video elements (e.g., boxes, windows) for assigning to the video feed of a participant during virtual conferencing, and elements for presenting captured screen content.

The disclosed embodiments provide for a user (e.g., presenter) to design a room in which participants can view screen content captured during virtual conferencing. Each participant is assigned to a participant video element within the room. The room as designed allows the user to share screen content (e.g., in a share screen element) and to capture the screen content (e.g., via a button or predefined gesture). The captured screen content is collected in a list of screen captures which is viewable by the participants. In this way, the viewers may review prior screen content within the room while virtual conferencing. Moreover, the list of screen captures may be surfaced to breakout rooms for discussion in smaller groups.

By virtue of allowing a user to customize a room to include screen sharing and to archive and present a list of screen captures, it is possible improve different types of virtual conferencing environments (e.g., seminars, classrooms, hangouts, and the like). In addition, the design of the room may be more engaging for participants of the virtual conference. Without allowing the user (e.g., administrator) to configure a room in this manner, the participants may otherwise be limited in viewing and referring back to prior screen content. The disclosed embodiments facilitate creation and participation with respect to virtual conferencing environments, thereby saving time for the user, and reducing computational resources/processing power.

Figure 1:
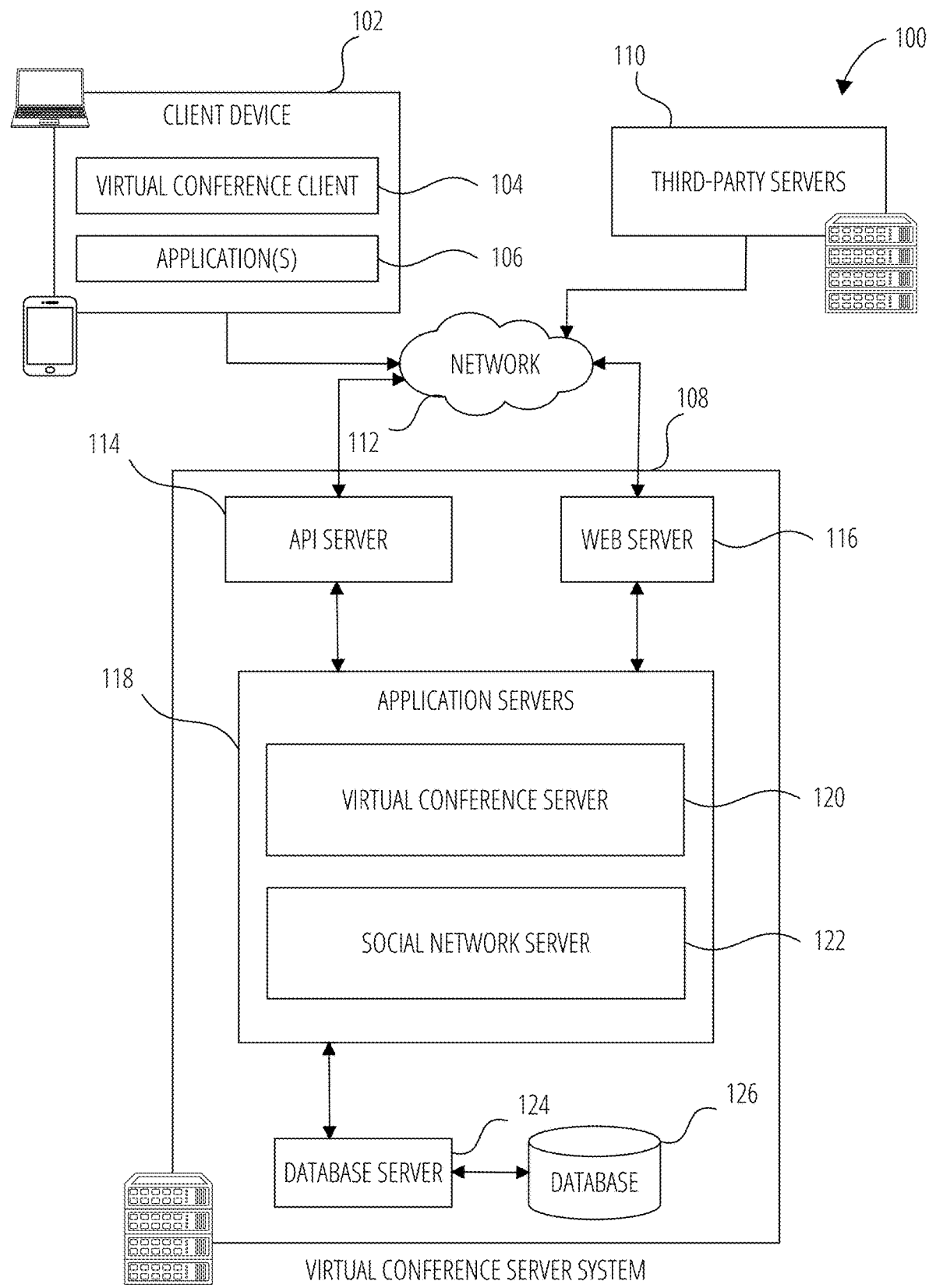
FIG. 1 is a diagrammatic representation of a networked environment in which the present disclosure may be deployed, in accordance with some examples.

FIG. 1 is a block diagram showing an example virtual conferencing system 100 for exchanging data over a network. The virtual conferencing system 100 includes multiple instances of a client device 102, each of which hosts a number of applications, including a virtual conference client 104 and other application(s) 106. Each virtual conference client 104 is communicatively coupled to other instances of the virtual conference client 104 (e.g., hosted on respective other client devices 102), a virtual conference server system 108 and third-party servers 110 via a network 112 (e.g., the Internet). A virtual conference client 104 can also communicate with locally-hosted applications 106 using Applications Program Interfaces (APIs).

The virtual conferencing system 100 provides for the reception and transmission of audio, video, image, text and/or other signals by user devices (e.g., at different locations), for communication between users in real-time. In some cases, two users may utilize virtual conferencing to communicate with each other in one-to-one communication at their respective devices. In other cases, multiway virtual conferencing may be utilized by more than two users to participate in a real-time, group conversation. Thus, multiple client devices 102 may participate in virtual conferencing, for example, with the client devices 102 participating in a group conversation in which audio-video content streams and/or message content (e.g., text, images) are transmitted between the participant devices.

A virtual conference client 104 is able to communicate and exchange data with other virtual conference clients 104 and with the virtual conference server system 108 via the network 112. The data exchanged between virtual conference clients 104, and between a virtual conference client 104 and the virtual conference server system 108, includes functions (e.g., commands to invoke functions) as well as payload data (e.g., video, audio, other multimedia, text).

The virtual conference server system 108 provides server-side functionality via the network 112 to a particular virtual conference client 104. For example, with respect to transmitting audio and/or video streams, the virtual conference client 104 (e.g., installed on a first client device 102) may facilitate in transmitting streaming content to the virtual conference server system 108 for subsequent receipt by other participant devices (e.g., one or more second client devices 102) running respective instances of the virtual conference client 104.

The streaming content can correspond to audio and/or video content captured by sensors (e.g., microphones, video cameras) on the client devices 102, for example, corresponding to real-time video and/or audio capture of the users (e.g., faces) and/or other sights and sounds captured by the respective device. The streaming content may be supplemented with other audio/visual data (e.g., animations, overlays, emoticons and the like) and/or message content (e.g., text, stickers, emojis, other image/video data), for example, in conjunction with extension applications and/or widgets associated with the virtual conference client 104.

While certain functions of the virtual conferencing system 100 are described herein as being performed by either a virtual conference client 104 or by the virtual conference server system 108, the location of certain functionality either within the virtual conference client 104 or the virtual conference server system 108 may be a design choice. For example, it may be technically preferable to initially deploy certain technology and functionality within the virtual conference server system 108 but to later migrate this technology and functionality to the virtual conference client 104 where a client device 102 has sufficient processing capacity.

The virtual conference server system 108 supports various services and operations that are provided to the virtual conference client 104. Such operations include transmitting data to, receiving data from, and processing data generated by the virtual conference client 104. This data may include the above-mentioned streaming content and/or message content, client device information, and social network information, as examples. Data exchanges within the virtual conferencing system 100 are invoked and controlled through functions available via user interfaces (UIs) of the virtual conference client 104.

Turning now specifically to the virtual conference server system 108, an Application Program Interface (API) server 114 is coupled to, and provides a programmatic interface to, application servers 118. The application servers 118 are communicatively coupled to a database server 124, which facilitates access to a database 126 that stores data associated with virtual conference content processed by the application servers 118. Similarly, a web server 116 is coupled to the application servers 118, and provides web-based interfaces to the application servers 118. To this end, the web server 116 processes incoming network requests over the Hypertext Transfer Protocol (HTTP) and several other related protocols.

The Application Program Interface (API) server 114 receives and transmits virtual conference data (e.g., commands, audio/video payloads) between the client device 102 and the application servers 118. Specifically, the Application Program Interface (API) server 114 provides a set of interfaces (e.g., routines and protocols) that can be called or queried by the virtual conference client 104 in order to invoke functionality of the application servers 118. The Application Program Interface (API) server 114 exposes various functions supported by the application servers 118, including account registration, login functionality, the streaming of audio and/or video content, and/or the sending and retrieval of message content, via the application servers 118, from a particular virtual conference client 104 to another virtual conference client 104, the retrieval of a list of contacts of a user of a client device 102, the addition and deletion of users (e.g., contacts) to a user graph (e.g., a social graph), and opening an application event (e.g., relating to the virtual conference client 104).

The application servers 118 host a number of server applications and subsystems, including for example a virtual conference server 120 and a social network server 122. The virtual conference server 120 implements a number of virtual conference processing technologies and functions, particularly related to the aggregation and other processing of content (e.g., streaming content) included in audio-video feeds received from multiple instances of the virtual conference client 104. Other processor and memory intensive processing of data may also be performed server-side by the virtual conference server 120, in view of the hardware requirements for such processing.

Figure 3:
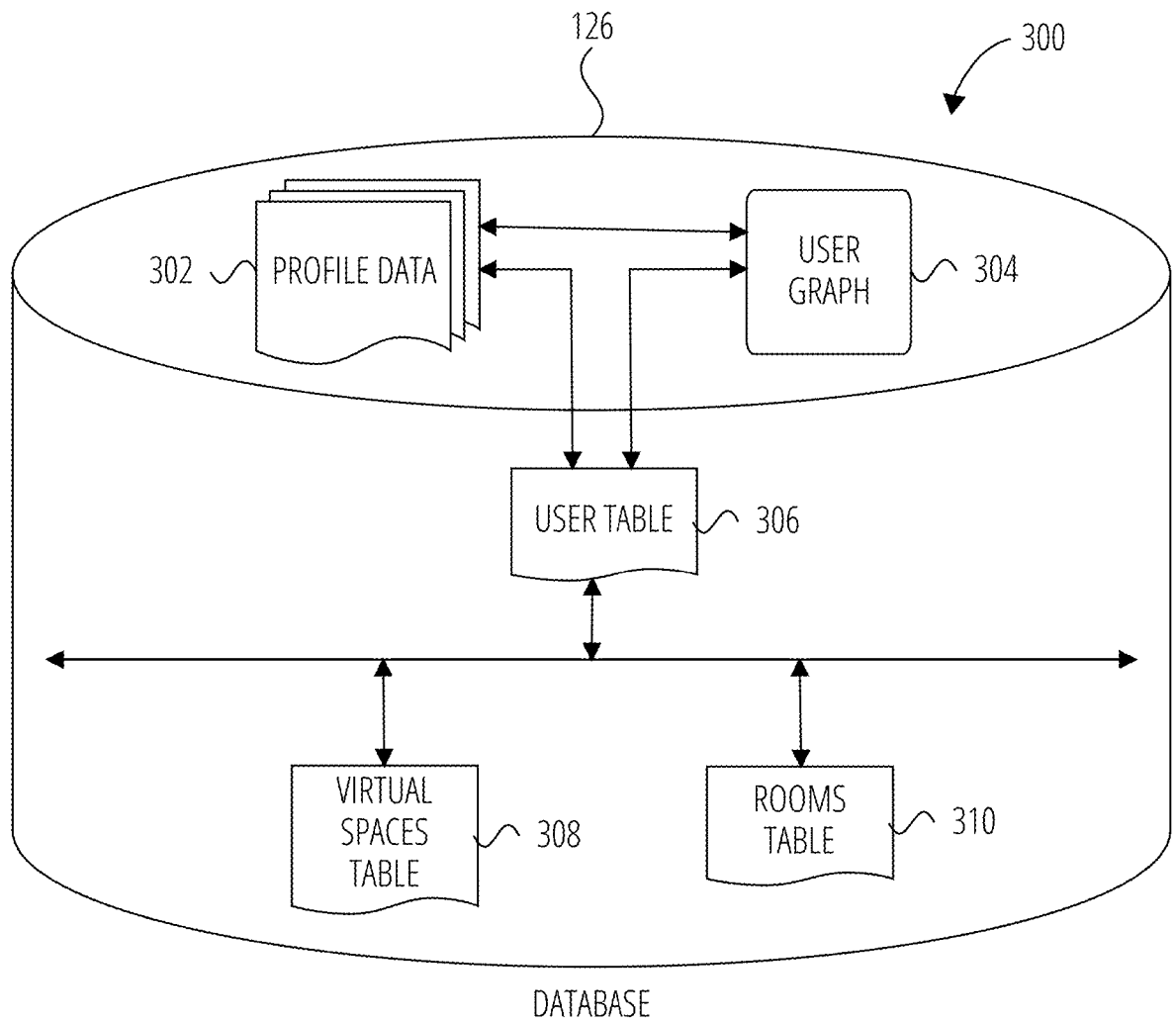
FIG. 3 is a diagrammatic representation of a data structure as maintained in a database, in accordance with some examples.

The social network server 122 supports various social networking functions and services and makes these functions and services available to the virtual conference server 120. To this end, the social network server 122 maintains and accesses a user graph 304 (as shown in FIG. 3) within the database 126. Examples of functions and services supported by the social network server 122 include the identification of other users of the virtual conferencing system 100 with which a particular user has relationships (e.g., contacts such as friends, colleagues, teachers, students, and the like).

In one or more embodiments, a user interacting via the virtual conference client 104 running on a first client device 102 may select and invite participant(s) to a virtual conference. For example, the participants may be selected from contacts maintained by the social network server 122. In another example, the participants may be selected from contacts included within a contact address book stored in association with the first client device 102 (e.g., in local memory or in a cloud-based user account). In another example, the participants may be selected by the user manually entering email addresses and/or phone numbers of the participants.

The user at the first client device 102 may initiate the virtual conference by selecting an appropriate user interface element provided by the virtual conference client 104, thereby prompting the invited participants, at their respective devices (e.g., one or more second client devices 102), to accept or decline participation in the virtual conference. When the participant(s) have accepted the invitation (e.g., via the prompt), the virtual conference server system 108 may perform an initialization procedure in which session information is published between the participant client devices 102, including the user who provided the invite. Each of the participant client devices 102 may provide respective session information to the virtual conference server system 108, which in turn publishes the session information to the other participant client devices 102. The session information for each client device 102 may include content stream(s) and/or message content that is made available by the client device 102, together with respective identifiers for the content stream(s) and/or message content.

As described below with respect to FIG. 2, the virtual conference may correspond to a virtual space which includes one or more rooms (e.g., virtual rooms). The virtual space and its corresponding rooms may have been created at least in part by the inviting user and/or by other users. In this manner, an end user may act as an administrator, who creates their own virtual spaces with rooms, and/or designs a virtual space based on preset available rooms.

Figure 2:
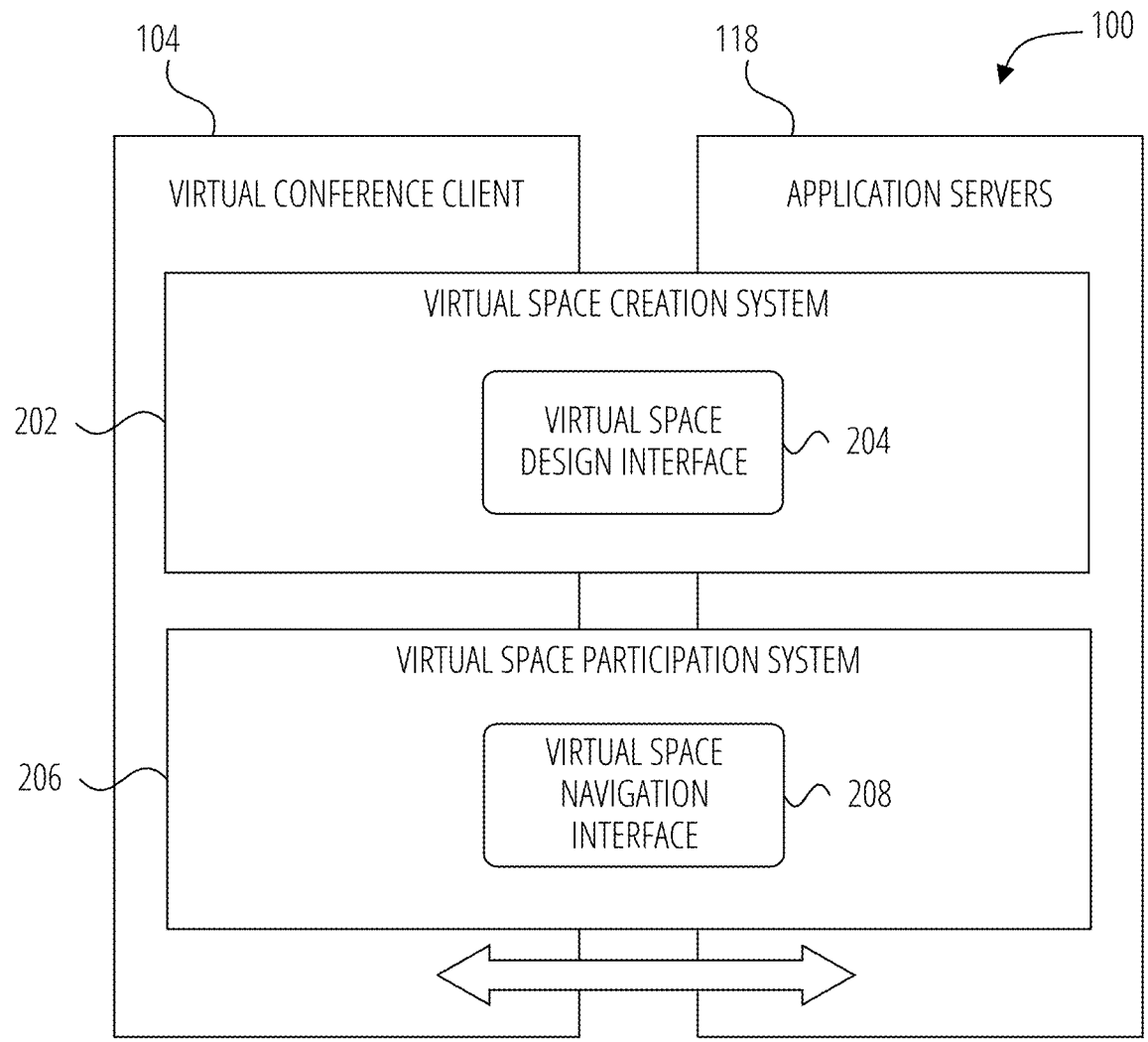
FIG. 2 is a diagrammatic representation of a virtual conferencing system, in accordance with some examples, that has both client-side and server-side functionality.

FIG. 2 is a block diagram illustrating further details regarding the virtual conferencing system 100, according to some examples. Specifically, the virtual conferencing system 100 is shown to comprise the virtual conference client 104 and the application servers 118. The virtual conferencing system 100 embodies a number of subsystems, which are supported on the client-side by the virtual conference client 104 and on the server-side by the application servers 118. These subsystems include, for example, a virtual space creation system 202 which implements a virtual space design interface 204, and a virtual space participation system 206 which implements a virtual space navigation interface 208.

The virtual space creation system 202 provides for a user to design one or more virtual space(s) in which participants may engage in virtual conferencing. In one or more embodiments, a virtual space corresponds to an environment with one or more rooms configured to accommodate virtual conferencing.

The virtual space may be created and/or selected (e.g., from among a set of predefined virtual spaces with rooms) by an end user who wishes to invite other users for virtual conferencing. In addition, the individual rooms of a virtual space may be newly-created and/or selected (e.g., from among a set of predefined rooms) by the end user. In one or more embodiments, the virtual space creation system 202 includes a virtual space design interface 204, which is usable by the end user to design a virtual space, including creating and/or selecting rooms for including in the virtual space.

As discussed below with respect to FIG. 4, the virtual space design interface 204 enables an end user (e.g., an administrator) to select and/or position multiple elements for including in a room. Examples of elements include, but are not limited to, participant video elements (e.g., for displaying the respective video feeds of participants), chat interfaces (e.g., for participants to provide text-based messages, stickers and/or reactions within a room), breakout buttons (e.g., for shuffling from a first room to one or more second rooms), and/or other user-definable elements for performing certain actions (e.g., speaking into a virtual microphone, querying an administrator via a button, and the like).

The virtual space participation system 206 is configured to perform virtual conferencing among participants within a virtual space. The participants may include the end user (e.g., administrator) who created the virtual space, as well as those users who were invited to participate in virtual conferencing with respect to the virtual space created/selected by the end user. The virtual space participation system 206 includes a virtual space navigation interface 208 (e.g., discussed below with respect to FIG. 5) that allows participants to navigate between the rooms of a virtual space, and to participate in virtual conferencing with respect to the rooms.

In one or more embodiments, the virtual space creation system 202 and the virtual space participation system 206 provide for an end user (e.g., an administrator) to create different types of environments (e.g., virtual spaces with rooms) for virtual conferencing, and for participants to engage in virtual conferencing within such environments. Examples of such virtual conferencing include, but are not limited to: business meetings, seminars, presentations, classroom lectures, teacher office hours, concerts, reunions, virtual dinners, escape rooms, and the like.

FIG. 3 is a schematic diagram illustrating data structures 300, which may be stored in the database 126 of the virtual conference server system 108, according to certain examples. While the content of the database 126 is shown to comprise a number of tables, it will be appreciated that the data could be stored in other types of data structures (e.g., as an object-oriented database).

The database 126 includes profile data 302, a user graph 304 and a user table 306 relating to the users (participants) of the virtual conferencing system 100. The user table 306 stores user data, and is linked (e.g., referentially) to the user graph 304 and the profile data 302. Each user of the virtual conferencing system 100 is associated with a unique identifier (email address, telephone number, social network identifier, etc.).

The user graph 304 stores (e.g., in conjunction with the social network server 122) information regarding relationships and associations between users. Such relationships may be social, professional (e.g., work at a common corporation or organization) interested-based or activity-based, merely for example. As noted above, the user graph 304 may be maintained and accessed at least in part by the social network server 122.

The profile data 302 stores multiple types of profile data about a particular user. The profile data 302 may be selectively used and presented to other users of the virtual conferencing system 100, based on privacy settings specified by a particular user. The profile data 302 includes, for example, a user name, telephone number, email address, and/or settings (e.g., notification and privacy settings), as well as a user-selected avatar representation.

The database 126 further includes a virtual spaces table 308. As noted above, a virtual space corresponds to an environment with one or more rooms configured to accommodate virtual conferencing. A virtual space may be newly-created by a user, or may be included within one or more sets of public virtual spaces made available (e.g., by other users, system administrators, and the like) for virtual conferencing. The virtual spaces table 308 stores information representing the one or more sets of public virtual spaces, as well as any private virtual space(s) created by a user (e.g., in a case where the particular user did not make such virtual space(s) public).

In one or more embodiments, the virtual spaces table 308 stores associations between its virtual spaces and users (e.g., within the user table 306) who selected those virtual spaces. In this manner, it is possible for a particular user to have one or more virtual spaces associated therewith. Moreover, the database 126 includes a rooms table 310 which may be associated with the virtual spaces within the virtual spaces table 308. As noted above, a room may be newly-created by a user, or may be included within one or more sets (e.g., galleries) of public rooms made available for user selection. The rooms table 310 stores information representing the one or more sets of rooms, as well as any private room(s) created by the user (e.g., in a case where the particular user did not make such room(s) public). The stored information is usable by the virtual conferencing system 100 to create the corresponding rooms for use in a virtual space. In one or more embodiments, the stored information may further include recordings (e.g., audio and/or video recordings) of a particular virtual conference, for subsequent playback by corresponding participants.

Figure 4:
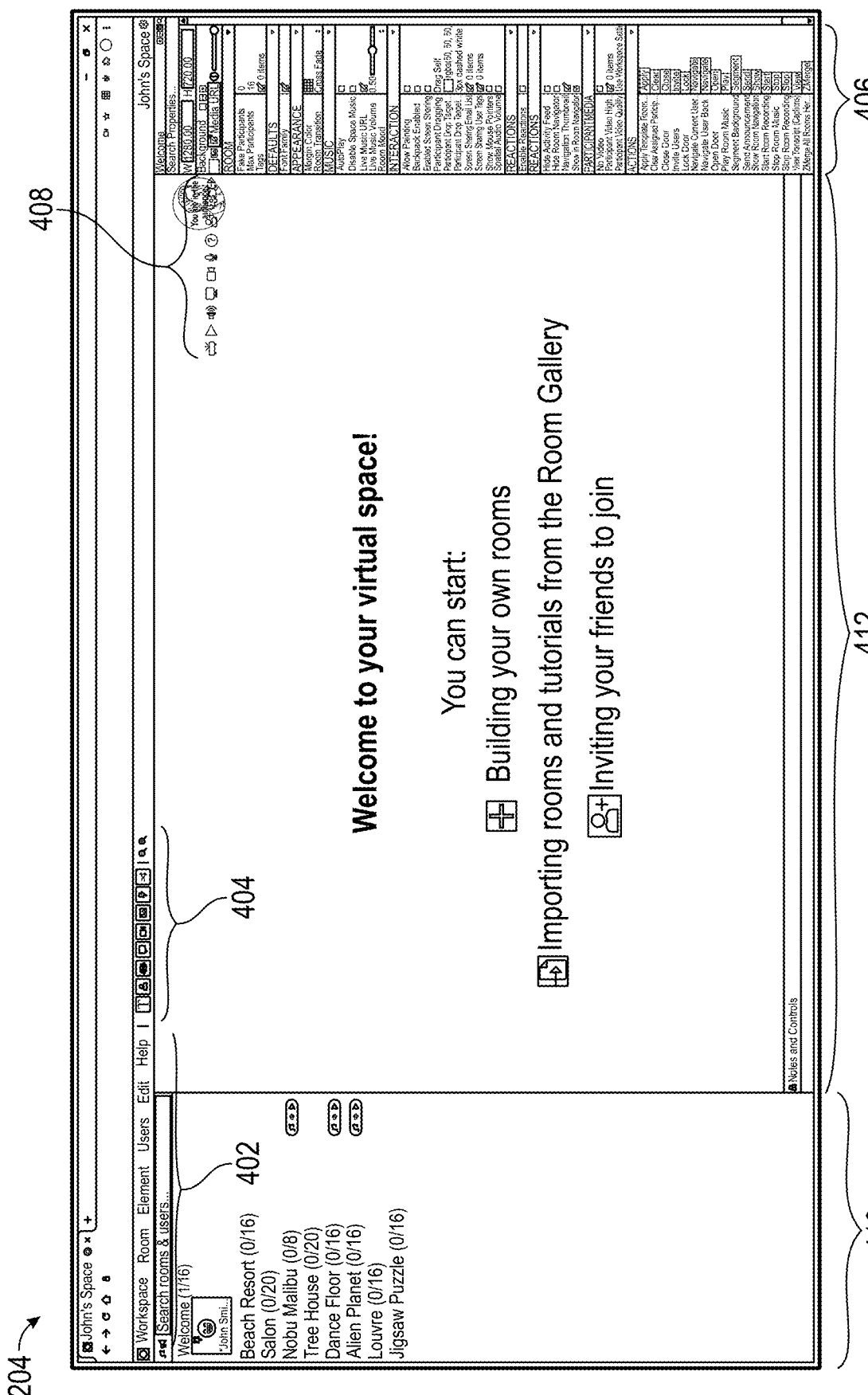
FIG. 4 illustrates a virtual space design interface with interface elements for designing a virtual space, in accordance with some example embodiments.

FIG. 4 illustrates a virtual space design interface 204 with interface elements for designing a virtual space, in accordance with some example embodiments. Designing the virtual space may include creation and/or selection of rooms for including in the virtual space. The virtual space design interface 204 includes a menu interface 402, a room elements interface 404, an element properties interface 406, a controls interface 408, a room list interface 410, a room canvas interface 412, and an administrator name 414. It is noted that elements 402-414 correspond to an example of interface elements for the virtual space design interface 204, and that additional, fewer and/or different interface elements may be used.

An administrator (e.g., corresponding to administrator name 414) may use the various interface elements to design a virtual space. In one or more embodiments, the menu interface 402 includes user-selectable categories (e.g., menu headings) relating to a virtual space (e.g., "workspace"), rooms within the virtual space, and/or elements within a room. For example, the workspace category is user-selectable for presenting options (e.g., via a drop-down list) to manage settings for the virtual space, manage invites for the virtual space, manage versions of a virtual space, publish the virtual space (e.g., for future use by users), manage virtual space publications, and/or to start/manage recordings (e.g., audio and/or video recordings) with respect to the virtual space.

The room category of the menu interface 402 is user-selectable for presenting options (e.g., via a drop-down list) to manage settings for a room within the virtual space, set a room background, set an order for the rooms listed in the room list interface 410, create a new room, import a room from a set of available rooms, remove a room, publish a room, manage room publications, and/or to start/manage recordings with respect to a room.

In addition, the element category is user-selectable for presenting options (e.g., via a drop-down list) to insert elements into a room, insert shapes into a room, foreground/background elements, arrange/position elements, and/or group elements. Examples of elements include, but are not limited to: an action button, analog clock, audience question board, backpack item, breakout button, chat, closed caption display, closed caption input, countdown, clock, digital clock, doorbell, double-sided image, feedback, image, multiuser video chat, music, participant audio mixer, participant count, participant video element (e.g., single or multiple), picture strip, poll, random source, room preview, scheduled time, sound effect, stopwatch, take picture, text, timer, user search, video, waiting list, web media, website. Examples of shapes include, but are not limited to, a circle, rectangle and triangle.

The users category of the menu interface 402 is user-selectable for presenting options (e.g., via a drop-down list) to manage users/participants of the virtual space (e.g., adding tags for participants, so as to distinguish between roles such as an administrator or an attendee/participant). In addition, the edit category is user-selectable for performing edit operations (e.g., undo, redo, cut, copy, paste), and the help category is user-selectable for performing help operations (e.g., getting started, discord, live help, submitting feedback).

In one or more embodiments, the room elements interface 404 includes user-selectable icons for inserting elements (e.g., corresponding to a subset of those available via the above-mentioned element category) into a current room. For example, the elements may be added and/or positioned within the current room by selecting the element and dragging the selected element onto the room canvas interface 412, which represents the layout of the current room.

In one or more embodiments, the room elements interface 404 include icons including but not limited to: a text icon for adding text to a room; a participant video icon for adding a single participant video element (e.g., an interface element which is selectable by a single participant for displaying that participant's video feed) to a room; a multiuser video icon for adding a multiple participant video element (e.g., an interface element which is selectable by one or more participants for displaying the video feeds for those participants) to a room; a screen share icon for adding a screen share element (e.g., an interface element for a user such as presenter to share their display, application window or a browser tab) to a room; a list of screen captures icon for adding a list of screen captures to a room; a 360-degree video icon for adding a 360-degree video element (e.g., an interface element for displaying a video feed from a 360-degree video camera) to a room; a chat icon for adding a chat interface (e.g., for messaging using text, stickers, emojis, etc.) to a room; a video playback icon for adding a video playback element (e.g., screen) to a room for playback of a selected video; a background icon for selecting a background color/gradient, image or video to a room; an action icon for adding an action element (e.g., button) to a room for performing a user-defined action (e.g., speaking into a virtual microphone, querying an administrator via a button, and the like); and/or a breakout button for adding a breakout element (e.g., button) to a room, for shuffling selected participants between the current room and one or more other rooms.

The single participant video element is configured to be assignable (e.g., during a virtual conferencing) to a single participant video feed (e.g., including video and/or audio). On the other hand, the multiple participant video element is configured to be assignable to multiple participant video feeds (e.g., including video and/or audio). For example, the multi-participant video element is configurable (e.g., via its respective element properties interface 406) to accommodate a user-specified number of the participant video feeds.

In one or more embodiments, the element properties interface 406 include various fields for setting configuration properties for above-described room elements. For example, with respect to elements in general (e.g., text, single participant video element, multiple participant video element, chat interface, video element, background image, action element, breakout button), the element properties interface 406 includes fields for setting the element title/name, opacity, gradient, style, layout, borders/corners, shadows, interaction (e.g., to what extent participant(s) may delete, modify, resize the element), filtering, full screen status, conditions, accessibility and actions for the element.

For a participant video element, the element properties interface 406 includes further fields for setting the manner in which users are placed into the participant video element during virtual conferencing (e.g., automatically, manually by the participant and/or the administrator end user). For a 360-degree video element, the element properties interface 406 includes further fields for setting the manner in which 360-degree video is presented in the 360-degree video element during virtual conferencing (e.g., source URL, whether the 360-degree video element is controllable by participants). In addition, for the chat interface, the element properties interface 406 includes further properties for setting who (e.g., administrator and/or participants) can provide chat input, and/or which types of input (e.g., text, stickers, emojis, etc.) are available. For the action element, the element properties interface 406 includes further properties for setting what type of action is to be performed in response to user selection of the action element (e.g., button). Moreover, for the breakout element, the element properties interface 406 includes further properties for selecting participants and/or breakout rooms.

In one or more embodiments, the element properties interface 406 further includes fields for setting configuration properties for the room canvas interface 412. For example, the element properties interface 406 includes fields for selecting a number of fake participants (e.g., simulated video feeds) in order to visualize multiple users, selecting music (e.g., background music), and/or selecting reaction buttons for participants to indicate real-time reactions with respect to virtual conferencing within a room.

In one or more embodiments, the virtual space design interface 204 provides for a designer of a room to create a room background. The room background may depict a number of objects including seating objects. Examples of seating objects include chairs, sofas, swings, mats, beanbags, grass, the ground and the like. However, the virtual space design interface 204 is not limited to using seating objects for the positioning of participant video elements. For example, an administrator may select to position participant video elements on or near other objects in a room, such as windows, clocks, walls, etc.

Thus, the virtual space design interface 204 provides for a user to position, shape and/or size of room elements (e.g., participant video elements) anywhere within a room, such as relative to background objects. For example, the element properties interface 406 includes fields via which the user can input values to specify position, size or shape of the room elements. Alternatively or in addition, the room canvas interface 412 of the virtual space design interface 204 provides for a user to reposition, reshape and/or resize the room elements (e.g., participant video elements) via predefined user gestures (e.g., selecting and dragging elements, edges of elements, corners of elements, and the like). The virtual space design interface 204 may cause user changes made to room elements via the room canvas interface 412 to automatically update values within corresponding fields of the element properties interface 406.

In one or more embodiments, the room canvas interface 412 of the virtual space design interface 204 provides for a user to segment objects (e.g., background objects) depicted in the room, so as to define boundaries of the object. For example, the user may define line segments around an object (e.g., a sofa) using a predefined gesture in order to define the boundary of an object (e.g., clicking points corresponding to corners of the object in combination with pressing a predefined key). In addition, the virtual space design interface 204 provides for displaying the segmented objects relative to room elements (e.g., participant video elements) of the room. For example, a segmented sofa may be displayed in front of, or behind (based on user-selected properties) elements, to create the perception of depth to the end user.

In one or more embodiments, the controls interface 408 includes user-selectable icons corresponding to controls (e.g., administrative controls) for the virtual space. For example, the controls interface 408 include icons including but not limited to: a director mode icon for toggling between a director mode for designing a room and a user mode for viewing the room within the virtual space design interface 204 (e.g., with the director mode including the room elements interface 404 and the element properties interface 406 while the user mode does not); a view icon for viewing the room within the virtual space navigation interface 208; a share screen icon (e.g., for collaborative design with other user(s) such as co-administrators); a microphone icon for enabling or disabling the microphone; a help icon (e.g., getting started, discord, live help, submitting feedback); an invite icon (e.g., for displaying an invite link for sending to participants to visit the virtual space); a settings icon (e.g., for selecting the end user's video and audio devices for the virtual conferencing, and for selecting a user avatar); and/or an exit icon for exiting the virtual space design interface 204.

In one or more embodiments, the room list interface 410 displays the list of rooms for the virtual space. Each listed room is user selectable to switch to edit (e.g., in director mode) and/or view (e.g., in user mode) the selected room. As noted above, the list of rooms may be modified (e.g., by adding, importing and/or removing rooms) via the options within the room category of the menu interface 402.

Figure 5:
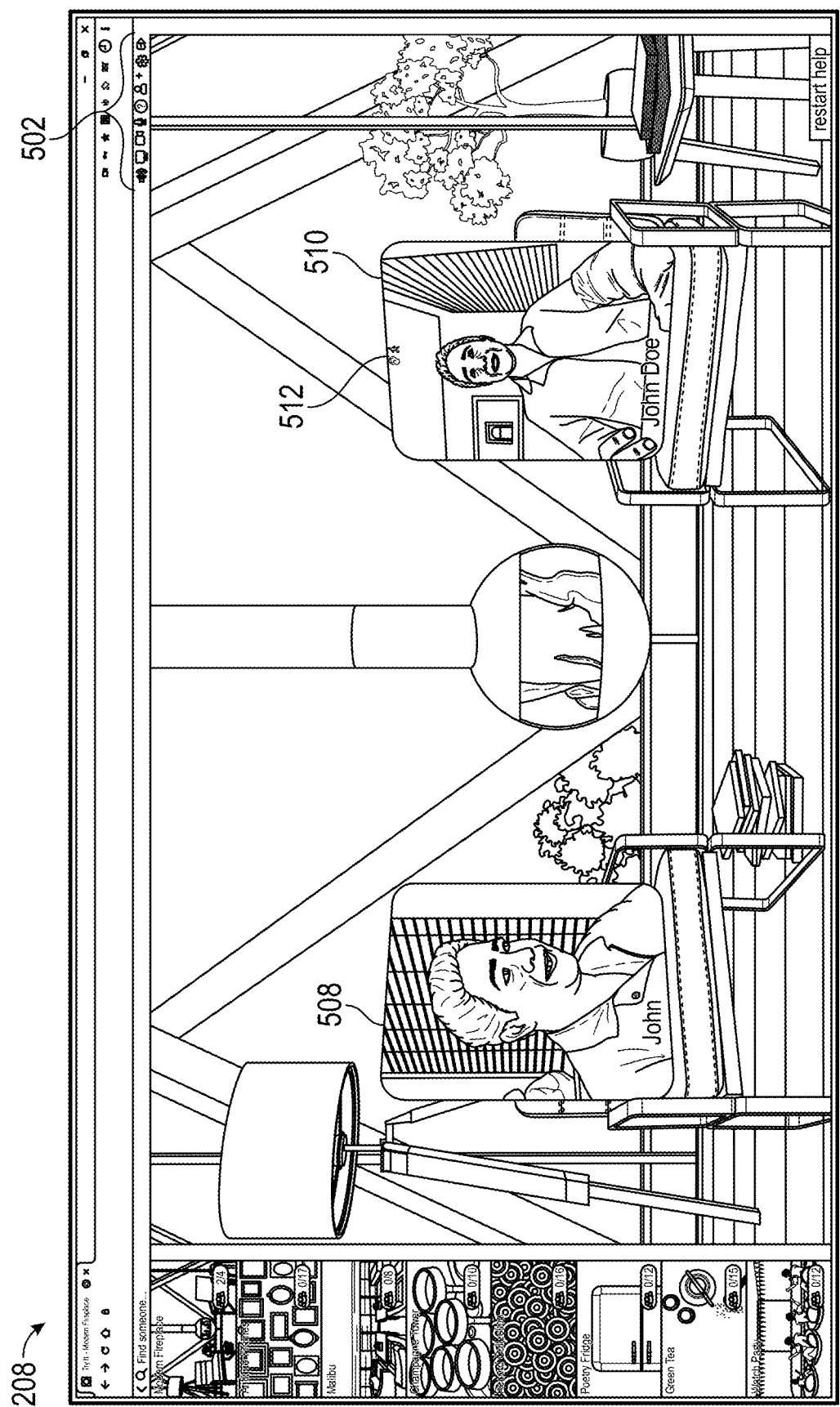
FIG. 5 illustrates a virtual space navigation interface with interface elements to navigate between the rooms of a virtual space and to participate in virtual conferencing with respect to the rooms, in accordance with some example embodiments.

FIG. 5 illustrates a virtual space navigation interface 208 with interface elements to navigate between the rooms of a virtual space and to participate in virtual conferencing with respect to the rooms, in accordance with some example embodiments. The virtual space navigation interface 208 includes a controls interface 502, a room list interface 504, a current room interface 506, a participant video element 508 and a participant video element 510. It is noted that elements 502-512 correspond to an example of interface elements for the virtual space navigation interface 208, and that additional, fewer and/or different interface elements may be used.

In one or more embodiments, the controls interface 502 includes user-selectable icons corresponding to controls (e.g., administrative controls) for the virtual space. For example, the controls interface 408 include icons including but not limited to: an edit icon for redirecting to the virtual space design interface 204 to edit the current room; a volume icon for adjusting a volume level for the current room; a share screen icon (e.g., for allowing others to view the room without necessarily joining the room); a microphone icon for muting and unmuting the microphone; a help icon (e.g., getting started, discord, live help, submitting feedback); an invite icon (e.g., for displaying an invite link for participants to visit the virtual space); a settings icon (e.g., for selecting the end user's video and audio devices for the virtual conferencing, and for selecting a user avatar); and/or an exit icon for exiting the virtual space design interface 204.

In one or more embodiments, the room list interface 504 displays the list of rooms for the virtual space. Each listed room is user selectable to switch to the selected room (e.g., for virtual conferencing). The selected room is presented as a current room within the current room interface 506. In this manner, a participant may navigate among the multiple rooms available within the virtual space. Alternatively or in addition, navigation between rooms is possible via a virtual space map interface (not shown) which depicts a map view of the virtual space (e.g., a floor plan) and its corresponding rooms, with each room being user selectable to navigate thereto. Alternatively or in addition, navigation between rooms is further possible by positioning a navigation button (not shown) within a room, where user selection of the button results in navigating to another room (e.g., a predefined room). As noted above, the virtual space design interface 204 allows for the design of a virtual space and its corresponding rooms. As such, navigation between rooms is based at least in part on the design of the virtual space (e.g., a virtual space may include one or more of the above-mentioned room list interface 504, the virtual space map/floor plan interface and/or the navigation button).

With respect to the current room interface 506, each participant is represented as a respective participant video element. As noted above, a participant video element corresponds to an interface element (e.g., a box) which is selectable by a single participant for displaying that participant's video feed. The example of FIG. 5 includes a first participant associated with the participant video element 508 and a second participant associated with the participant video element 510. In one or more embodiments, with respect to the perspective of the first participant, the participant video element 510 showing the feed of the second participant may include participant button(s) 512. For example, the participant button(s) 512 are selectable by the first participant so as to perform a predefined action (e.g., initiate a side conversation, designate the second participant to follow the first participant when the first participant moves rooms) with respect to the second participant.

In one or more embodiments, the virtual space navigation interface 208 may vary based on whether a given participant is an administrator or another participant (e.g., an attendee). For example, some participant video elements may be designated (e.g., via the virtual space design interface 204) for administrators, while other participant video elements are designated for other participants. The virtual conference server system 108 is configured to distinguish between these administrator or other participant roles, for example, based on the above-described tags assigned to participants via the users category of the menu interface 402 provided by the virtual space design interface 204.

While the example of FIG. 5 illustrates two participants, it is possible for the current room interface 506 to accommodate additional participants for virtual conferencing. The additional participants may be positioned (e.g., automatically and/or manually by dragging) based on the positioning of participant video elements (e.g., boxes) as designed by the virtual space design interface 204. As noted above, the element properties interface 406 includes fields for setting the manner in which participant video feeds are assigned and placed into the participant video element during virtual conferencing (e.g., automatically, manually by the participant and/or the administrator end user). With respect to automatic placement, the virtual conference server system 108 may follow a predefined order (e.g., as specified during room design) for placing participant video feeds with respective participant video elements.

Regarding manual placement, the virtual conference server system 108 provides for the participants to manually select which available (e.g., unoccupied) participant video element to position their respective participant video feed. For example, the manual selection is performed using a predefined gesture (e.g., a drag and drop operation of the participant video feed to a selected participant video element). Based on room design, the virtual conference server system 108 provides one or more of the administrator (e.g., presenter) or participants (e.g., attendees) to manually assign a participant video feed to a participant video element.

In one or more embodiments, assignments between participant video feeds and participant video elements may be a combination of automatic and manual selection. For example, assignments may default to automatic and be initially be based on automatic selection. At a later time, with proper settings per the design of the room, participant(s) may manually select a different available participant video element to be assigned to.

In the example of FIG. 5, the participant video feeds of the first participant and the second participant(s) are assigned to the participant video elements 508-510 within the current room interface 506 based on automatic and/or manual selection. The first and second participants can participate in virtual conferencing, and observe each other's participant video feeds which may appear to be positioned relative to objects (e.g., seating objects) in the room.

Thus, the virtual conferencing system 100 as described herein allows a user, in designing a room for virtual conferencing, to position and/or size participant video elements (e.g., based on objects depicted in the room). Each of the participant video elements corresponds to a potential placeholder for a participant. During virtual conferencing within the room (e.g., the current room interface 506), the video feeds of participants are assigned to the participant video elements 508-510.

Figure 6:
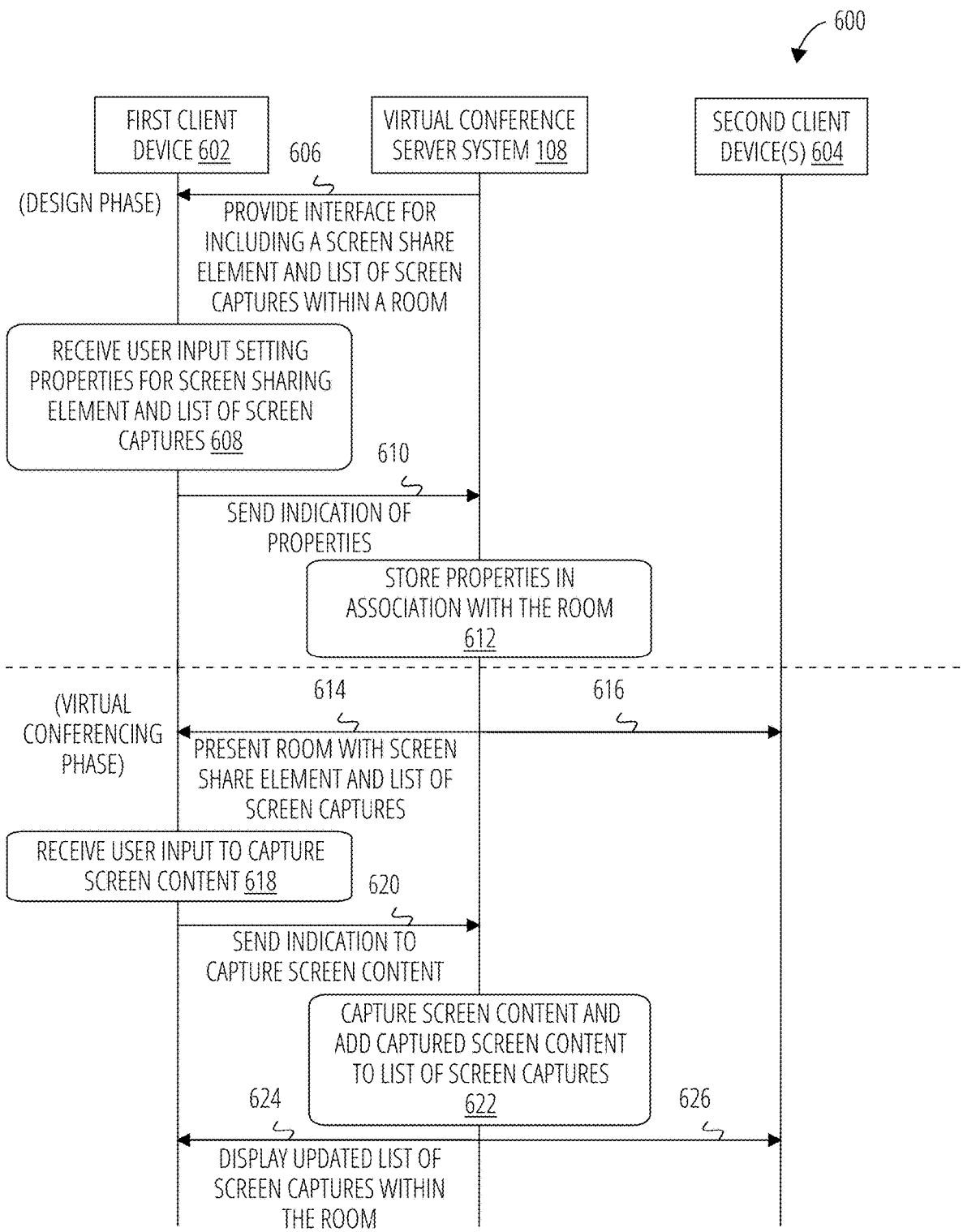
FIG. 6 is an interaction diagram illustrating a process for presenting captured screen content within a virtual conferencing system, in accordance with some example embodiments.

FIG. 6 is an interaction diagram illustrating a process 600 for presenting captured screen content within a virtual conferencing system, in accordance with some example embodiments. For explanatory purposes, the process 600 is described herein with reference to a first client device 602, one or more second client device(s) 604, and the virtual conference server system 108. Each of the first client device 602 and the second client device(s) 604 may correspond to a respective client device 102. The process 600 is not limited to the first client device 602, the second client device(s) 604 and the virtual conference server system 108. Moreover, one or more blocks (or operations) of the process 600 may be performed by one or more other components of the first client device 602, the second client device(s) 604 or the virtual conference server system 108, and/or by other suitable devices. Further for explanatory purposes, the blocks (or operations) of the process 600 are described herein as occurring in serial, or linearly. However, multiple blocks (or operations) of the process 600 may occur in parallel or concurrently. In addition, the blocks (or operations) of the process 600 need not be performed in the order shown and/or one or more blocks (or operations) of the process 600 need not be performed and/or can be replaced by other operations. The process 600 may be terminated when its operations are completed. In addition, the process 600 may correspond to a method, a procedure, an algorithm, etc.

Each of the first client device 602 and the second client device(s) 604 have instances of the virtual conference client 104 installed thereon. In the example of FIG. 6, the first client device 602 and the one or more second client device(s) 604 are associated with a respective first participant and respective one or more second participant(s) of the virtual conference server system 108. For example, the first participant may be associated with a first user account of the virtual conference server system 108, and the second participant(s) may be associated with second user account(s) of the virtual conference server system 108.

As noted above, the first participant and second participant(s) are identifiable by the virtual conference server system 108 based on unique identifiers (e.g., email addresses, telephone numbers) associated with respective user accounts for the first participant and second participant(s). In one or more embodiments, the virtual conference server system 108 implements and/or works in conjunction with a social network server 122 which is configured to identify contacts with which a particular user has relationships. For example, the first participant and second participant(s) may be contacts with respect to the virtual conference server system 108.

As described herein, the virtual conferencing system 100 allows a user (e.g., presenter) to design a room in which participants can view screen content captured during virtual conferencing. Each participant is assigned to a participant video element within the room. The room as designed allows the user to share screen content (e.g., in a share screen element) and to capture the screen content (e.g., via a button or predefined gesture). The captured screen content is collected in a list of screen captures which is viewable by the participants. In this way, the viewers may review prior screen content within the room while virtual conferencing. Moreover, the list of screen captures may be surfaced to breakout rooms for discussion in smaller groups.

In the example of FIG. 6, operations 606-612 may correspond to a first phase (e.g., a "design phase") and operations 614-626 may correspond to a second phase (e.g., a "virtual conferencing phase"). During the design phase, a user (e.g., administrator) provides input for setting properties (e.g., sizes, shapes, positions, effects) for the participant video elements, a screen share element (e.g., for a presenter to share screen content), a list of screen captures for presenting captured screen content, and any other elements in the room. During the virtual conferencing phase, the participant video elements, screen share element, list of screen captures, and other room elements are displayed based on their respective properties. In addition, the participant video feeds are assigned to respective participant video elements. It may be understood that the second phase may occur shortly after the first phase, or after an extended period of time after the first phase. As such, FIG. 6 includes a dashed line separating the first phase and the second phase for illustrative purposes.

FIG. 6 illustrates an example in which the user (e.g., administrator) designs the room with multiple participant video elements, and a single screen share element. It is understood that the virtual conferencing system 100 provides for alternate arrangements, for example, with different numbers of participant video elements (e.g., none, one, multiple) and/or different numbers of screen share elements (e.g., none, one, multiple).

At operation 606, the virtual conference server system 108 provides, to the first client device 602, an interface for including a screen share element and a list of screen captures within a room. The first client device 602 may correspond to an administrator who designs the room, and who acts as a presenter during virtual conferencing.

In one or more embodiments, the interface for including the screen share element and the list of screen captures in the room corresponds to the virtual space design interface 204, which includes the element properties interface 406. As noted above, the element properties interface 406 includes various fields for setting configuration properties for room elements, including participant video elements, a screen share element and/or a list of screen captures.

Each participant video element is configured to be assignable to a respective participant video feed (e.g., corresponding to a respective participant during virtual conferencing). As noted above, the room elements interface 404 of the virtual space design interface 204 includes respective elements for adding single participant video elements and/or multiple participant video elements to a room.

The element properties interface 406 in conjunction with the virtual space design interface 204 provides for configuring the number of participant video elements, screen share element, list of screen captures, and other elements in a room, as well as the positions, shapes and/or sizes for each of the elements. As noted above, the element properties interface 406 includes fields for setting the title/name, opacity, gradient, style, layout, borders/corners, shadows, interaction (e.g., to what extent participant(s) may delete, modify, resize the element), filtering, full screen status, conditions, accessibility and actions for the participant video elements and the 360-degree video elements. In addition, the element properties interface 406 includes fields for setting the manner in which users are placed into the participant video elements during virtual conferencing (e.g., automatically, manually by the participant and/or the administrator end user). The virtual space design interface 204 further provides for a designer of a room to create a room background (e.g., with seating objects), to position/place room elements anywhere within a room (e.g., relative to background objects), and/or to segment objects (e.g., background objects) depicted in the room for displaying room elements relative to one another.

Regarding the screen share element, the virtual space design interface 204 allows the user (e.g., designer) to set properties that: specify whether to share their entire display, an application window, or a browser tab; crop the screen share element; specify controls (e.g., a button, user gestures) for taking a screen capture; and/or specify which participants (e.g., the participant video element(s) corresponding to the presenter only, selected participants, or all participants) may share their screens within the screen share element. For the list of screen captures, the virtual space design interface 204 allows the user to set properties specifying controls for navigating/scrolling through the list of screen captures.

Thus, the virtual conference client 104 running on the first client device 602 provides display of the virtual space design interface 204, for setting properties of the various room elements, including the screen sharing element and the list of screen captures. The first client device 602 receives user input setting properties for the screen share element and the list of screen captures (block 608). The first client device 602 sends an indication of the properties to the virtual conference server system 108 (operation 610). For example, values input by the user at the first client device 602, for the various fields associated with screen sharing and capturing screen content, are sent from the first client device 602 to the virtual conference server system 108.

The virtual conference server system 108 stores the properties for the screen share element and the list of screen captures in association with the room (block 612). For example, the virtual conference server system 108 provides for storing the properties (e.g., user-selected values for the various fields) within the rooms table 310 of the database 126, in association with the room.

As noted above, operations 614-626 relate to a virtual conferencing phase, in which participants engage in virtual conferencing within the room. At operations 614-616, the virtual conference server system 108 provides for presenting the room based on the stored properties for the screen share element and list of screen captures. This includes presenting each of the screen share element, list of screen captures, and other room elements (e.g., participant video elements) based on each of their positions (e.g., including relative positions based on any segmented objects in the room), shapes, sizes and/or effects as configured by the user during design of the room.

For example, the virtual conference server system 108 assigns the video feeds with respective participant video elements. As noted above, for a participant video element, the element properties interface 406 includes fields for setting the manner in which participant video feeds are assigned and placed into the participant video element during virtual conferencing (e.g., automatically, manually by the participant and/or the administrator end user). Thus, the participant video feeds of the first participant and the second participant(s) are assigned to participant video elements within the room based on automatic and/or manual selection as specified by the designer. The first and second participants can participate in virtual conferencing, and observe each other's participant video feeds.

The first client device 602 receives user input to capture screen content (block 618). In one or more embodiments, the user input for taking a screen capture is specified by the designer via the virtual space design interface 204. In response to detecting such user input, the first client device 602 sends, to the virtual conference server system 108, an indication to capture the screen content. The screen content for capturing may correspond to the entire display, an application window, or a browser tab, and may be cropped, based on the properties stored in the rooms table 310 at block 612.

In response to receiving the request and based on the stored properties, the virtual conference server system 108 provides for capturing the screen content (block 622). For example, the captured screen content is a screen capture of content appearing in the screen share element at the time the user input is received at block 618. The virtual conference server system 108 adds the captured screen content to the list of screen captures. For example, the list of screen captures is a chronologically-ordered list of all screen captures performed by the user (e.g., presenter) during the virtual conference within the room. The screen captures may correspond to screen content appearing within the screen share element, as provided by the presenter and/or by other participants (e.g., if permitted based on room design).

In one or more embodiments, the virtual conference server system 108 is configured to provide contextual information with respect to screen captures that are added to the list of screen captures. As noted above, the virtual conference server system 108 is configured to record audio during virtual conferencing. In a case where the presenter selects to capture a particular screen, the virtual conference server system 108 may perform voice recognition (e.g., speech-to-text) of the recorded audio (e.g., for the duration of time the screen was shared). The resulting text may be included as part of the screen capture, to provide context to those participants viewing the screen capture within the list of screen captures. The generation and display of such contextual information may be enabled/disabled during the design of the room.

The list of screen captures may be stored and continuously updated (e.g., as screen captures are taken) within the rooms table 310, together with contextual information (e.g., converted speech-to-text). Thus, block 622 may correspond with the virtual conference server system 108 updating the ordered list within the rooms table 310 to include the screen capture corresponding to operations 618-620.

At operations 624-626, the virtual conference server system 108 provides for displaying the updated list of screen captures within the room. The list of screen captures is selectable by room participants (e.g., viewers) to view, scroll through, export (e.g., sending and/or locally-saving with contextual information, if available) and the like. In one or more embodiments, the virtual conference server system 108 provides for the list of screen captures to be individually accessible (e.g., from the rooms table 310) by each participant, such that one participant's viewing and/or scrolling does not affect the viewing and/or scrolling by another participant.

As noted above, the virtual conference server system 108 is configured to provide for breakout rooms. For example, a breakout room is separate from a current room and allows a small group of participants to discuss a particular issue before returning to the main meeting. In the case of a breakout room, the current room may be designed (e.g., via the virtual space design interface 204) such that the updated list of screen captures is surfaced within the breakout room to facilitate discussion.

Thus, the virtual conferencing system 100 as described herein allows a user (e.g., presenter) to design a room in which participants can view screen content captured during virtual conferencing. Each participant is assigned to a participant video element within the room. The room as designed allows the user to share screen content (e.g., in a share screen element) and to capture the screen content (e.g., via a button or predefined gesture). The captured screen content is collected in a list of screen captures which is viewable by the participants. In this way, the viewers may review prior screen content within the room while virtual conferencing. Moreover, the list of screen captures may be surfaced to breakout rooms for discussion in smaller groups.

By virtue of allowing a user to customize a room to include screen sharing and to archive and present a list of screen captures, it is possible improve different types of virtual conferencing environments (e.g., seminars, classrooms, hangouts, and the like). In addition, the design of the room may be more engaging for participants of the virtual conference. Without allowing the user (e.g., administrator) to configure a room in this manner, the participants may otherwise be limited in viewing and referring back to prior screen content. The virtual conferencing system 100 facilitates creation and participation with respect to virtual conferencing environments, thereby saving time for the user, and reducing computational resources/processing power for the virtual conferencing system 100.

Figure 7:
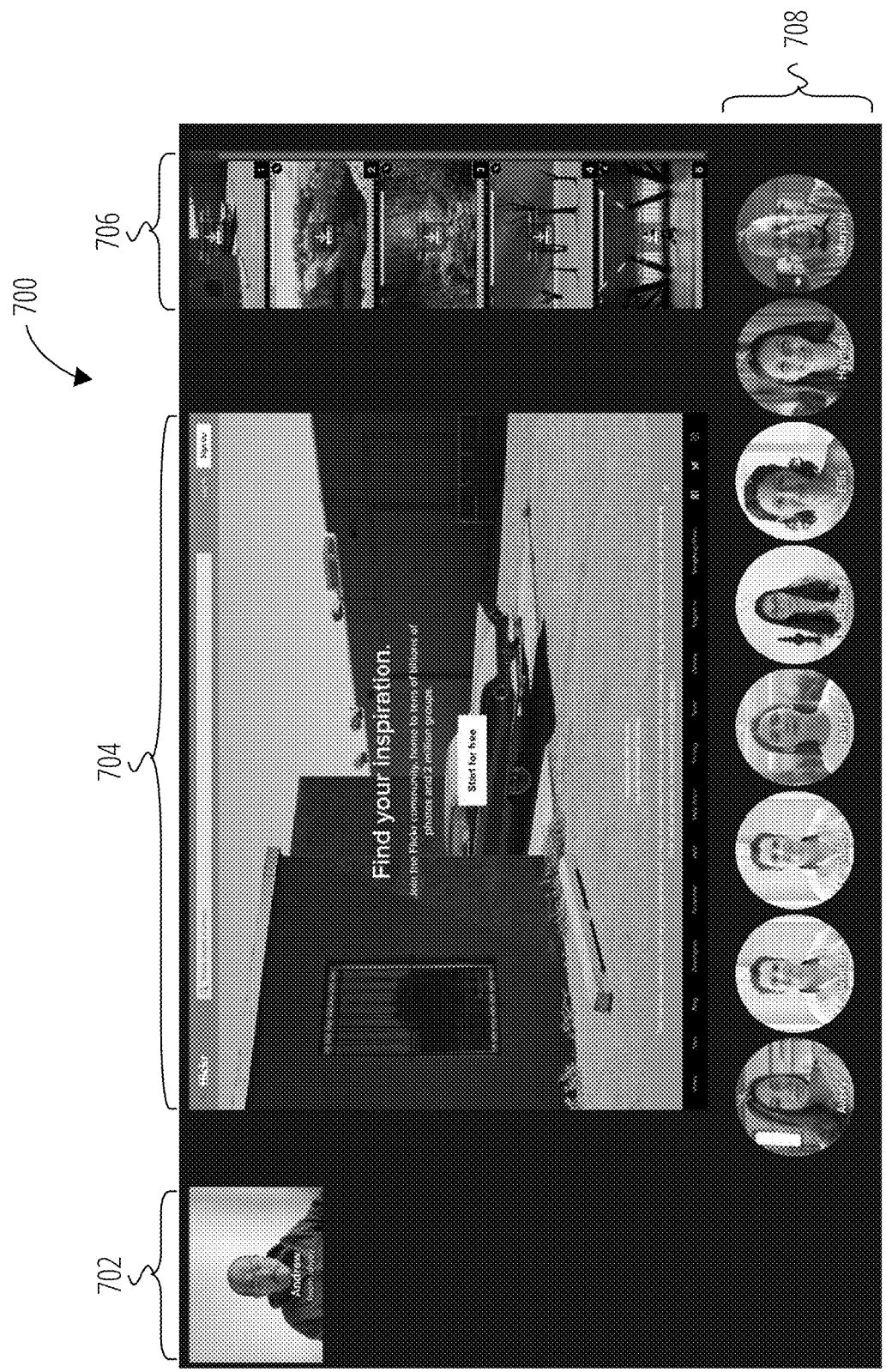
FIG. 7 illustrates an example current room interface for presenting captured screen content within a virtual conferencing system, in accordance with some example embodiments.

FIG. 7 illustrates an example current room interface 700 for presenting captured screen content within a virtual conferencing system, in accordance with some example embodiments. The current room interface 700 includes a first participant video element 702, a screen share element 704, a list of screen captures 706 and a second participant video elements 708. In one or more embodiments, the current room interface 700 is included within a virtual space navigation interface 208 (e.g., per FIG. 5).

The example of FIG. 7 depicts a first participant video element 702 and multiple second participant video elements 708 positioned within a room. Each of the first participant video element 702 and the second participant video elements 708 is assigned to a particular participant video feed. As noted above, the participant video feed may be assigned automatically or manually, based on the design of the current room (e.g., corresponding to the current room interface 700).

In addition, the current room interface 700 includes the screen share element 704. As noted above, the screen share element 704 is configured to display screen content of the first participant and/or second participants (e.g., based on room design). The screen content may correspond to an entire display, an application window, or a browser tab.

Moreover, the current room interface 700 allows for the user to capture screen content in response to predefined user input (e.g., a button press, a gesture). For example, the captured screen content may correspond to the content displayed within the screen share element 704.

The captured screen content is added to an ordered list of screen captures 706. The list of screen captures 706 may include all screen captures performed during a virtual conferencing session, such that the participants can view and refer back to the prior screen captures. In one or more embodiments, the list of screen captures 706 may correspond to a slideshow, which is selectable by an end user (e.g., participants) to individually view the prior screen captures as a slideshow, without causing all participants to view the slideshow.

Figure 8:
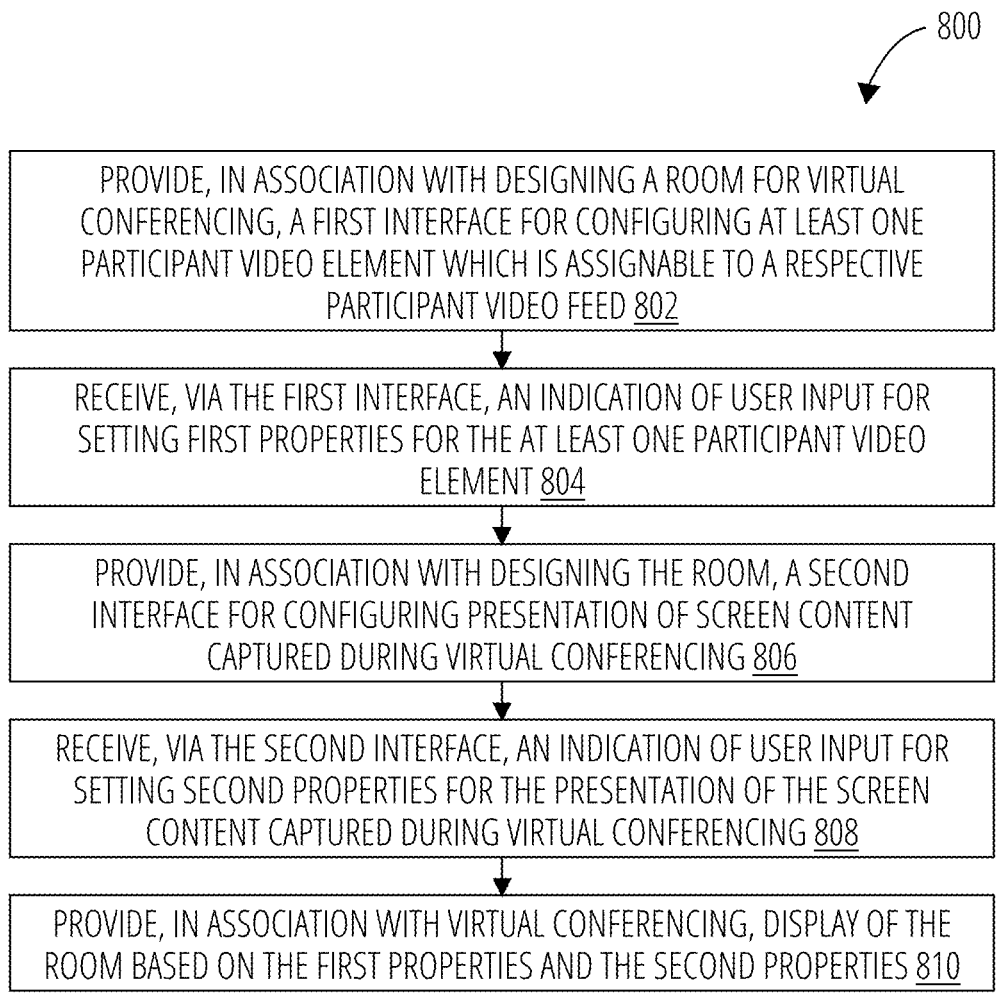
FIG. 8 is a flowchart illustrating a process for presenting captured screen content within a virtual conferencing system, in accordance with some example embodiments.

FIG. 8 is a flowchart illustrating a process 800 for presenting captured screen content within a virtual conferencing system, in accordance with some example embodiments. For explanatory purposes, the process 800 is primarily described herein with reference to the first client device 602, the second client device(s) 604 and the virtual conference server system 108 of FIG. 1 and FIG. 2. However, one or more blocks (or operations) of the process 800 may be performed by one or more other components, and/or by other suitable devices. Further for explanatory purposes, the blocks (or operations) of the process 800 are described herein as occurring in serial, or linearly. However, multiple blocks (or operations) of the process 800 may occur in parallel or concurrently. In addition, the blocks (or operations) of the process 800 need not be performed in the order shown and/or one or more blocks (or operations) of the process 800 need not be performed and/or can be replaced by other operations. The process 800 may be terminated when its operations are completed. In addition, the process 800 may correspond to a method, a procedure, an algorithm, etc.

The virtual conference server system 108 provides, in association with designing a room for virtual conferencing, a first interface for configuring at least one participant video element which is assignable to a respective participant video feed (block 802). The virtual conference server system 108 receives, via the first interface and from the first client device 602, an indication of user input for setting first properties for the at least one participant video element (block 804).

The virtual conference server system 108 provides, in association with designing the room, a second interface for configuring presentation of screen content captured during virtual conferencing (block 806). The second interface may include interface elements for adding a screen share element to the room for sharing screen content during virtual conferencing, and for adding a list of screen captures to the room for displaying an ordered list of screen content captured during virtual conferencing. The first interface and the second interface may provide for configuring at least one of positions, shapes or sizes of the at least one participant video element, the screen share element or the list of screen captures.

The virtual conference server system 108 receives, via the second interface and from the first client device 602, an indication of user input for setting second properties for the presentation of the screen content captured during virtual conferencing (block 808). The virtual conference server system 108 provides, in association with virtual conferencing and for the first client device 602 and the second client device(s) 604, display of the room based on the first properties and the second properties (block 810).

The virtual conference server system 108 may store, prior to providing display of the room, the first properties and the second properties in association with the room. The virtual conference server system 108 may provide display of the list of screen captures within a breakout room associated with the room.

The virtual conference server system 108 may assign, for each of plural participants associated with the virtual conferencing, a participant video feed corresponding to the participant with a respective participant video element of the at least one participant video element. The assigning may be performed manually, via user selection by one or more of the plural participants, based on the first properties and second properties. Alternatively, the assigning may be performed automatically based on the first properties and the second properties.

Figure 9:
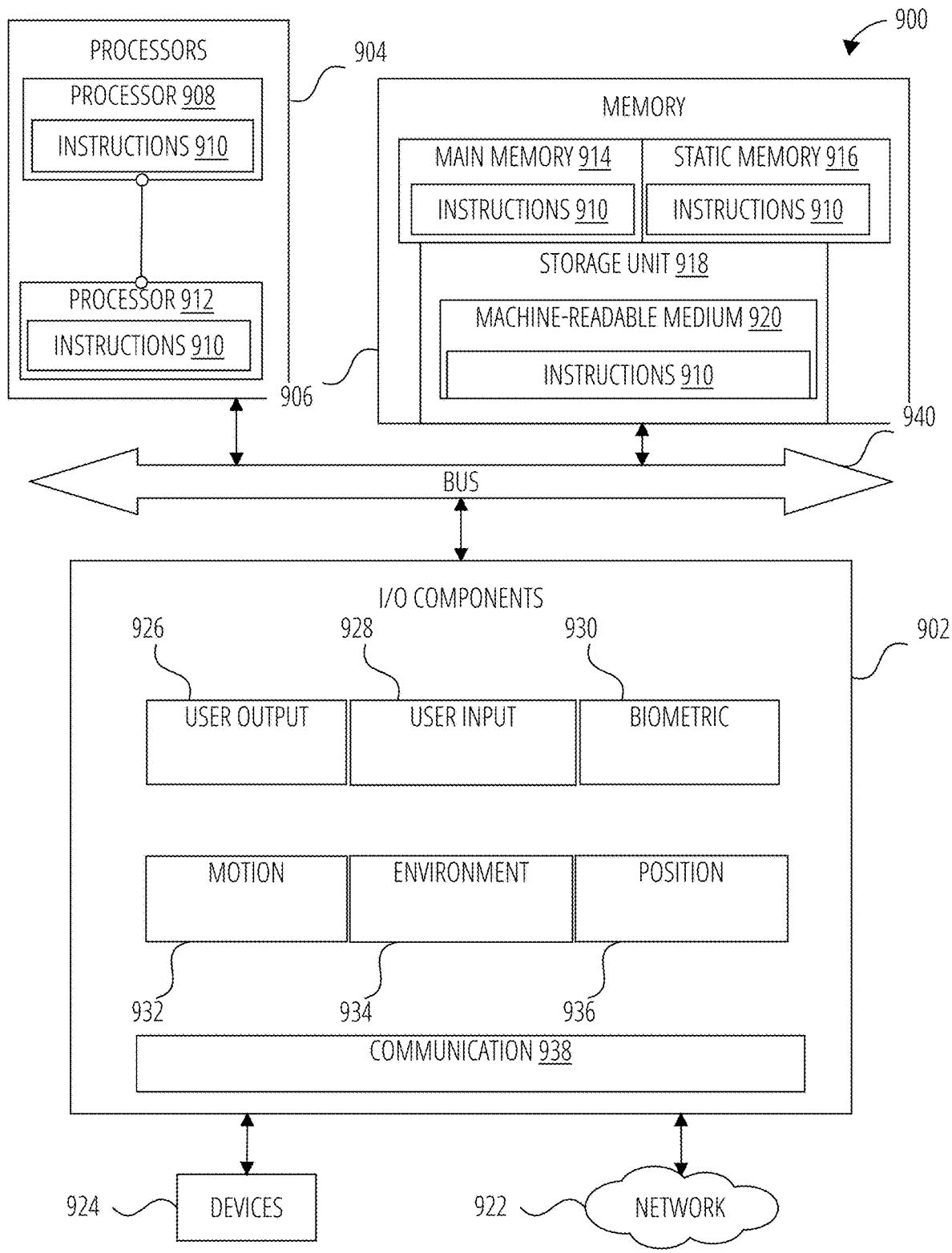
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 910 (e.g., software, a program, an application, an applet, an app, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein. The machine 900, for example, may comprise the client device 102 or any one of a number of server devices forming part of the virtual conference server system 108. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 902, which may be configured to communicate with each other via a bus 940. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, both accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the Processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include user output components 926 and user input components 928. The user output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

The environmental components 934 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 936 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 938 operable to couple the machine 900 to a network 922 or devices 924 via respective coupling or connections. For example, the communication components 938 may include a network interface Component or another suitable device to interface with the network 922. In further examples, the communication components 938 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

Figure 10:
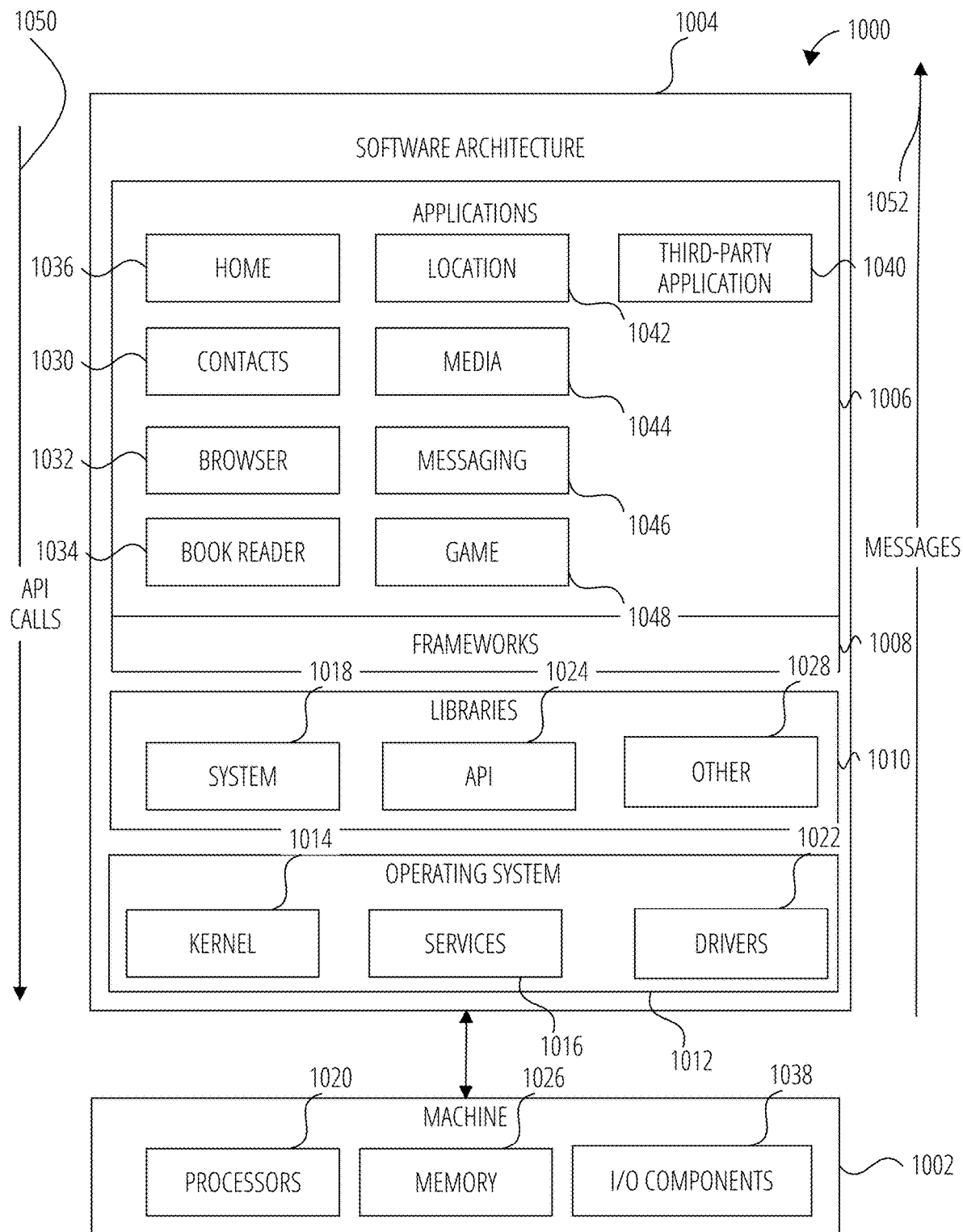
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
   providing, in association with designing a room for a virtual conference and prior to the video conference, a first interface for configuring at least one participant video element which is assignable to a respective participant video feed;
   receiving, via the first interface, an indication of user input for setting first properties for the at least one participant video element;
   providing, in association with designing the room and prior to the video conference, a second interface for configuring a screen share element for the room including cropping the screen share element and for configuring a list of screen captures for the room, the screen share element for sharing screen content during virtual conferencing, and the list of screen captures for displaying an ordered list of the screen content as captured during virtual conferencing;
   receiving, via the second interface, an indication of user input for setting second properties for the screen share element and for the list of screen captures;
   providing, during the virtual conference, display of the room for a plurality of participants of the video conference including the screen share element, the list of screen captures, and the participant video feed based on the first properties and the second properties;
   causing audio comprising speech to be recorded in association with capturing at least one screen capture within the list of screen captures;
   converting the speech to text; and
   causing the text to be included as part of the at least one screen capture within the list of screen captures during the video conference.

2. The method of claim 1, wherein the first interface and the second interface provide for configuring at least one of positions, shapes or sizes of the at least one participant video element, the screen share element or the list of screen captures.

3. The method of claim 1, further comprising: providing display of the list of screen captures within a breakout room associated with the room.

4. The method of claim 1, further comprising:
   assigning, for each participant of the plurality of participants associated with the virtual conference, a participant video feed corresponding to the participant with a respective participant video element of the at least one participant video element.

5. The method of claim 4, wherein the assigning is performed manually, via user selection by one or more of the plurality of participants, based on the first properties and second properties.

6. The method of claim 4, wherein the assigning is performed automatically based on the first properties and the second properties.

7. The method of claim 1, further comprising:
   storing, prior to providing display of the room, the first properties and the second properties in association with the room.

8. A system comprising:
   a processor; and a memory storing instructions that, when executed by the processor, configure the processor to perform operations comprising:
   providing, in association with designing a room for a virtual conference and prior to the video conference, a first interface for configuring at least one participant video element which is assignable to a respective participant video feed;
   receiving, via the first interface, an indication of user input for setting first properties for the at least one participant video element;
   providing, in association with designing the room and prior to the video conference, a second interface for configuring a screen share element for the room including cropping the screen share element and for configuring a list of screen captures for the room, the screen share element for sharing screen content during virtual conferencing, and the list of screen captures for displaying an ordered list of the screen content as captured during virtual conferencing;
   receiving, via the second interface, an indication of user input for setting second properties for the screen share element and for the list of screen captures;
   providing, during the virtual conference, display of the room for a plurality of participants of the video conference including the screen share element, the list of screen captures, and the participant video feed based on the first properties and the second properties;
   causing audio comprising speech to be recorded in association with capturing at least one screen capture within the list of screen captures;
   converting the speech to text; and
   causing the text to be included as part of the at least one screen capture within the list of screen captures during the video conference.

9. The system of claim 8, wherein the first interface and the second interface
   provide for configuring at least one of positions, shapes or sizes of the at least one participant video element, the screen share element or the list of screen captures.

10. The system of claim 8, the operations further comprising:
providing display of the list of screen captures within a breakout room associated with the room.

11. The system of claim 8, the operations further comprising:
assigning, for each participant of the plurality of participants associated with the virtual conference, a participant video feed corresponding to the participant with a respective participant video element of the at least one participant video element.

12. The system of claim 11, wherein the assigning is performed manually, via user selection by one or more of the plurality of participants, based on the first properties and second properties.

13. The system of claim 11, wherein the assigning is performed automatically based on the first properties and the second properties.

14. The system of claim 8, the operations further comprising:
storing, prior to providing display of the room, the first properties and the second properties in association with the room.

15. A non-transitory computer-readable storage medium, the computer-readable storage medium including instructions that when executed by a computer, cause the computer to perform operations comprising:
providing, in association with designing a room for a virtual conference and prior to the video conference, a first interface for configuring at least one participant video element which is assignable to a respective participant video feed;
receiving, via the first interface, an indication of user input for setting first properties for the at least one participant video element;
providing, in association with designing the room and prior to the video conference, a second interface for configuring a screen share element for the room including cropping the screen share element and for configuring a list of screen captures for the room, the screen share element for sharing screen content during virtual conferencing, and the list of screen captures for displaying an ordered list of the screen content as captured during virtual conferencing;
receiving, via the second interface, an indication of user input for setting second properties for the screen share element and for the list of screen captures;
providing, during the virtual conference, display of the room for a plurality of participants of the video conference including the screen share element, the list of screen captures, and the participant video feed based on the first properties and the second properties;
causing audio comprising speech to be recorded in association with capturing at least one screen capture within the list of screen captures;
converting the speech to text; and
causing the text to be included as part of the at least one screen capture within the list of screen captures during the video conference.

16. The computer-readable medium of claim 15, wherein the first interface and the second interface provide for configuring at least one of positions, shapes or sizes of the at least one participant video element, the screen share element or the list of screen captures.

17. The computer-readable medium of claim 15, the operations further comprising:
providing display of the list of screen captures within a breakout room associated with the room.

18. The computer-readable medium of claim 15, wherein the instructions further configure the computer to:
assigning, for each participant of the plurality of participants associated with the virtual conference, a participant video feed corresponding to the participant with a respective participant video element of the at least one participant video element.

19. The computer-readable medium of claim 18, wherein the assigning is performed manually, via user selection by one or more of the plurality of participants, based on the first properties and second properties.

20. The method of claim 4, wherein the screen share element is configured to share screen content, being displayed on a first device of a first participant of the plurality of participants, with second devices of second participants of the plurality of participants, and
wherein the screen content corresponds to an entire display, an application window or a browser tab being displayed on the first device of the first user.

* * * * *